3,331,800
PREPARATION OF SOLUTIONS OF POLYHYDROXYMETHYLENE-CONTAINING POLYMERS

Hans Schübel, Heinz Ratz, and Gerhard Bier, Troisdorf, Germany, assignors to Dynamit Nobel Aktiengesellschaft, Troisdorf, Bezirk Cologne, Germany, a corporation of Germany
No Drawing. Filed July 2, 1965, Ser. No. 469,351
Claims priority, application Germany, July 7, 1964, D 44,864
22 Claims. (Cl. 260—29.6)

This invention relates to the production of solutions of polymers containing recurring hydroxymethylene units. More particularly, this invention relates to a method for dissolving polyhydroxymethylene $(-CHOH)_n$ in the aqueous phase.

Polyhydroxymethylenes are well known materials. They may be prepared by the polymerization of vinylene carbonate to form homo-polymers. Copolymers of polyhydroxymethylenes can be made with vinyl acetate, vinyl chloride, vinylidene chloride, acrylonitrile, methacrylonitrile, acrylic acid, acrylate esters (such as methyl, ethyl, butyl or octyl acrylates), vinyl ethers and ketones (such as methyl-vinyl-ether or methyl-vinyl-ketone), olefins such as ethylene and other olefinically-unsaturated compounds by similar polymerization techniques. The homo- or co-polymers thus produced can be readily saponified, preferably by alkaline saponification, so as to convert at least the carbonate linkage to the corresponding alcohol and thereby form polymers containing recurring hydroxy methylene groups. Where copolymers containing vinyl esters or ethers as co-mer units are used, these may, under appropriate conditions, be converted to vinyl alcohol (hydroxy vinyl) mer units. In any case, polymers as described immediately above are desirable materials from which to form films, fibers, surface coatings, forms, and the like, having desirable properties.

Unfortunately, hydroxy methylene mer unit-containing polymers are not readily soluble to any appreciable extent in any commonly known solvent materials. For example, such homo-polymers are not soluble in dimethylformamide, dimethylsulfoxide, dilute or concentrated mineral acids, aqueous solutions of rhodamidone and lithium chloride, diethylene triamine or Schweizer reagent. The same homo-polymers are only very slightly soluble after 1% or, at the most, 2% in hot 20% caustic soda, 35% aqueous solution of benzyl trimethyl ammonium hydroxide or melted urea at 140° C., and such solutions as are possible with these reagents are unstable to the addition of further amounts of water or neutralization, as the case may be, which dilution or neutralization causes precipitation of the dissolved polymer (H. C. Haast and N. W. Schuler, J. Polymer Sci., 31, 237 (1958); H. L. Marder and C. Schuerch, J. Polymer Sci., 44, 129 (1960); N. D. Field and J. R. Schaefgen, J. Polymer Sci., 58, 533 (1962)).

It is therefore an object of this invention to provide solutions from which poly-(hydroxymethylene)-homo- and co-polymeric shapes and forms can be made.

It is another object of this invention to provide a method of producing a liquid solution suitable for use as a raw material for film-casting or extrusion either into fiber or film form, wherein the cast or extruded product has at least recurring hydroxymethylene mer units.

Other and addition objects of this invention will appear throughout the specification and the claims appended hereto.

In accordance with and fulfilling the objects of this invention, a homo- or co-polymeric material containing recurring hydroxymethylene units and preferably a preponderance of such units is xanthogenated with carbon disulfide to convert the hydroxy substituents to xanthogenate substituents; as the xanthogenates, the polymers of this invention, are quite readily soluble in aqueous alkali lyes, preferably potash or soda lyes. These solutions can be cast into film or extruded into film or fiber form and the hydroxymethylene polymer "sprung" or liberated from the xanthogenate by acids, such as dilute mineral, and particularly sulfuric, acids.

According to one embodiment or aspect of this invention, poly-(hydroxymethylene)-homo- or co-polymers are swollen with an aqueous base solution, preferably 20 to 50% by weight in concentration. These bases are exemplified by sodium or potassium hydroxide, tetraethyl ammonium hydroxide, triethyl-methyl-ammonium hydroxide, trimethyl-butyl ammonium hydroxide, tributylethyl ammonium hydroxide, trimethyl-p-tolyl ammonium hydroxide, and trimethylbenzyl ammonium hydroxide, and the like. This swelling may be carried out at room temperature or under action of mild heat, such as at temperatures of up to about 40° C. Swelling times range up to about 70 hours and constitute preferably about 3 hours. The result of the swelling operation is a gelatinous material from which excess base may be removed, if desired, by centrifugation, filtering or other similar and conventional operations.

The gelatinous material resulting from the swelling operation is treated with carbon disulfide to form the desired xanthogenate. This reaction is preferably carried out with excess carbon disulfide under conditions of agitation at about room temperature or slightly higher, as stated above. Suitably, this reaction takes about 3 to 12 hours to go to completion. One indication of the completion of the reaction is a change of color from orange-red to dark red. Where excess carbon disulfide has been used, it may be desirable to remove such excess upon completion of the xanthogenate-forming reaction.

Another embodiment of this invention envisions the reaction of carbon disulfide with the poly-(hydroxymethylene)-homo- or co-polymer followed by addition to the reaction product of a base as described above. In this embodiment, the xanthogenate forming reaction and the base addition are both carried out at room or slightly elevated temperatures for periods of about two and three hours, respectively.

Still another embodiment of this invention envisions the simultaneous admixing of carbon disulfide, base, and poly-(hydroxymethylene)-homo- or co-polymer with stirring. These are reactive at about room temperature to 40° C. for a time sufficient to complete the xanthogenate-forming reaction, as noted by the color change referred to above.

Regardless of which of the above embodiments are practiced, the resulting xanthogenate-containing polymer is dissolved in alkali lye. This solution can be carried out during the xanthogenate-forming reaction, after this reaction is complete or a combination of both of these, such that the final product solution has the proper concentration, viscosity and other properties, making the same an easily workable solution.

According to still another aspect of this invention, the finally desired alkali lye solution may be prepared in a single step by the simultaneous swelling, reaction, and solution of the poly-(hydroxymethylene)-homo- or co-polymer.

Still further, the production of the poly-(hydroxymethylene)-homo- or co-polymer (e.g., by saponification as referred to above) can be combined with the swelling, reaction, and solution steps as herein set out so that it is not necessary to recover the poly-(hydroxymethylene)-homo- or co-polymer intermediate products, but the final xanthogenate solution may be obtained directly from the poly-(vinylene carbonate)-homo- or co-polymer.

High and low molecular weight polymeric materials can be used as starting materials in this invention. For example, poly-(vinyl carbonates) having relative viscosities between about 1.6 and 5.4 or poly-(hydroxymethylene) obtained by saponification of these polymeric materials can be used conveniently.

The following examples serve to illustrate this invention but are in no way limitative thereof. In these examples parts and percentages are by weight unless expressly stated to be otherwise.

*Example 1*

Ten parts polyhydroxymethylene derived from a polyvinylene carbonate polymer having a relative viscosity of 2.4 were treated with 200 parts of 50% aqueous potash lye, and allowed to stand at 21° C. for 3 hours in a closed vessel with stirring. Eighty parts of excess potassium hydroxide were removed by centrifugation. The swollen residue remaining was stirred vigorously for 3 hours with 50 parts of carbondisulfide, whereupon a red coloration appeared, and the polyhydroxymethylene was converted into a transparent, colloidal mass. Unreacted carbon disulfide was removed in vacuum. The residue was thereafter stirred with 50 parts potassium hydroxide whereby a viscous solution of a poly xanthogenate was formed. Upon the introduction of the solution into dilute carbon disulfide, a further quantity of unreacted polyhydroxymethylene was precipitated as poly-xanthogenate, which was shown by analysis involving chemical methods as well as infra-red spectrum.

*Example 2*

Ten parts polyhydroxymethylene derived from polyvinyl carbonate having a relative viscosity of 5.4 were stirred for 2 hours at room temperature with 50 parts of carbon disulfide in an aqueous vessel, and subsequently treated with 170 parts of 50% potash lye and stirred for another 3 hours. After the removal of the excess carbon disulfide, a clear viscous solution of polyhydroxymethylene-xanthogenate appeared. Upon precipitation with dilute sulfuric acid, unreacted polyhydroxymethylene was again obtained.

*Example 3*

Ten parts of polyhydroxymethylene derived from a polyvinyl carbonate having a relative viscosity of 1.5, 50 parts carbon disulfide, and 120 parts of 50% potash lye were intimately admixed in a closed vessel at 20° C. for 4 hours, using mechanical stirring for the mixing. After this time no solid components could be found in the mixture. The carbon disulfide was removed by suction filtering and a transparent, tough material recovered which could be diluted by the addition of 50% potassium hydroxide and thereby brought to any viscosity desired. Precipitation with dilute sulfuric acid again produced unchanged polyhydroxymethylene.

*Example 4*

Fourteen parts of polyvinylene carbonate having a relative viscosity of 3.2, 50 parts of carbon disulfide, and 200 parts of 50% potash lye were heated to 40° C. for 8 hours under stirring. During this time the polyvinylene carbonate dissolved with the formation of a clear red solution from which unreacted carbon disulfide was removed using vacuum. Polyhydroxymethylene was produced by precipitation from solution in dilute sulfuric acid as confirmed by chemical and infra-red spectrum analyses.

*Example 5*

Ten parts polyhydroxymethylene derived from polyvinylene carbonate having a relative viscosity of 2.6 were treated with 200 parts of 50% caustic soda and allowed to remain in a closed vessel at 21° C. for 70 hours with stirring. Sixty-eight parts of sodium hydroxide were separated by centrifugation and the residue remaining stirred for 12 hours with 50 parts carbon disulfide until the mass had obtained a consistency as described in Example 1. After removal of the excess carbon disulfide, the residue was stirred with 100 parts of 50% sodium hydroxide whereby a viscous solution was produced from which unchanged polyhydroxymethylene could be obtained upon precipitation with dilute sulfuric acid.

*Example 6*

Ten parts of a copolymer which consisted of 90% vinylene carbonate

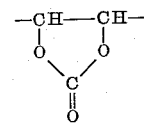

and 10% vinyl acetate mer

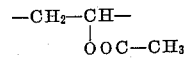

units and which had a relative viscosity of 1.65 were thoroughly mixed together using mechanical stirring for 6 hours at 30° C. with 150 parts of 50% potash lye and 50 parts of carbon disulfide. Following this treatment, solid material could no longer be detected in the bath. The remaining carbon disulfide was removed in vacuum, a red-colored viscous xanthogenate solution remaining. Upon precipitation of this solution with sulfuric acid, the same product was formed as could be obtained by saponification of the above-named copolymer. It has a preponderant polyhydroxymethylene structure as was established by both chemical and infra-red spectrum analyses.

We claim:

1. A process for dissolving a polyhydroxymethylene containing a polymer in the aqueous phase, which comprises reacting a polyhydroxymethylene-containing polymer with carbon disulfide and a base in aqueous phase to thereby form a solution of the corresponding polyxanthogenate.

2. A process as claimed in claim 1, wherein said base is at least one selected from the group consisting of sodium hydroxide, potassium hydroxide, tetraethyl-ammonium hydroxide, triethylmethyl-ammonium hydroxide, trimethyl-butyl-ammonium hydroxide, tributyl-ethyl-ammonium hydroxide, trimethyil-p-tolyl-ammonium hydroxide, and tri-benzyl-ammonium hydroxide.

3. A process as claimed in claim 1, wherein said polyhydroxy-methylene is treated with said aqueous base prior to reaction with said carbon disulfide.

4. A process according to claim 1, wherein said base is utilized in a concentration of about 20 to 50% by weight.

5. A process as claimed in claim 1, wherein said reaction with carbon disulfide and base is carried out simultaneously.

6. A process according to claim 1, wherein said polyhydroxymethylene is produced by hydrolysis of a polyvinylene carbonate.

7. A process according to claim 6, wherein said polyvinylene carbonate has a relative viscosity of about 1.6 to 5.4.

8. A process as claimed in claim 6, wherein said hydrolysis and reaction with carbon disulfide and base is carried out simultaneously.

9. A process for producing shaped articles of a polymer containing a preponderance of recurring hydroxymethylene mer units which comprises
   (a) forming a polyhydroxymethylene-containing polymer;
   (b) reacting said polymer with carbon disulfide to form a poly-xanthogenate;
   (c) dissolving said poly-xanthogenate in an inert solvent;
   (d) forming said shaped article, and (e) reacting said poly-xanthogenate in said shape with an acid, whereby said polyhydroxymethylene-polymer is regenerated in said shape.

10. A process as claimed in claim 9, wherein said polymer is a copolymer of hydroxymethylene mer units with at least one mer unit selected from the group consisting of vinyl acetate, vinyl chloride, vinylidene chloride, acrylonitrile, methacrylo-nitrile, acrylic acid, acrylate esters, vinylmethylether, vinylmethyl ketone, and ethylene.

11. A process as claimed in claim 9, wherein said process is carried out at about room temperature to about 40° C.

12. A process as claimed in claim 11, wherein said polyhydroxymethylene is swelled with an aqueous base prior to xanthogenation.

13. A process as claimed in claim 12, wherein said base is at least one member selected from the group consisting of sodium hydroxide, potassium hydroxide, tetraethylammonium hydroxide, triethylmethyl-ammonium hydroxide, trimethylbutyl-ammonium hydroxide, tributylethyl-ammonium hydroxide, trimethyl-p-tolyl-ammonium hydroxide, and tribenzylammonium hydroxide.

14. A process as claimed in claim 13, wherein said base is utilized in a concentration of about 20 to 50% by weight.

15. A process as claimed in claim 13, wherein said swelling and said carbon disulfide reaction steps are carried out simultaneously.

16. A process as claimed in claim 13, wherein said polyhydroxymethylene is produced by hydrolysis of a polyvinylene carbonate.

17. A process as claimed in claim 16, wherein said polyvinylene carbonate has a relative viscosity of about 1.6 to 5.4.

18. A process as claimed in claim 16, wherein said hydrolysis, swelling, and carbon disulfide reaction steps are carried out simultaneously.

19. A process as claimed in claim 13, wherein said poly-xanthogenate is dissolved in alkali lye.

20. A process as claimed in claim 19, carried out simultaneously.

21. A process as claimed in claim 16, wherein said poly-xanthogenate is dissolved in alkali lye.

22. A process as claimed in claim 21, carried out simultaneously.

References Cited

Chemical Abstract, vol. 52, pp. 12,801–12,802.

MURRAY TILLMAN, *Primary Examiner.*

W. J. BRIGGS, Sr., *Assistant Examiner.*